(No Model.)
L. ENRICHT.
METHOD OF PREPARING CONTINUOUS AND SOLID TILING.
No. 450,286. Patented Apr. 14, 1891.
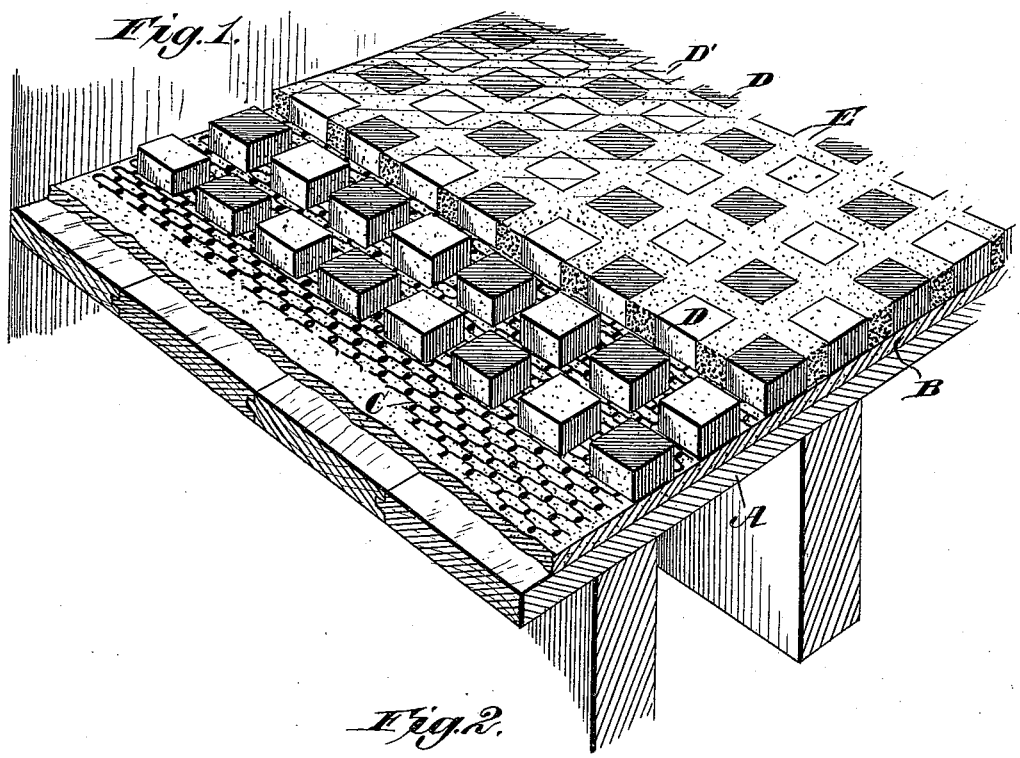
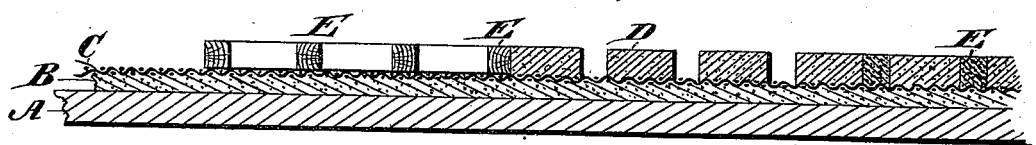
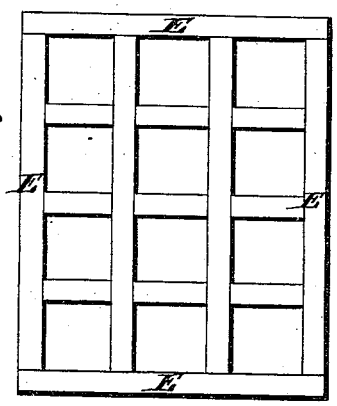
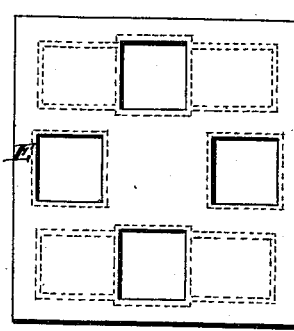
Witnesses.
Robert Everett
J. A. Rutherford
Inventor.
Louis Enricht.
By Van Santvoord & Hauff
Attys.

UNITED STATES PATENT OFFICE.

LOUIS ENRICHT, OF NEW YORK, N. Y., ASSIGNOR TO THE ENRICHT MANUFACTURING COMPANY, OF SAME PLACE.

METHOD OF PREPARING A CONTINUOUS AND SOLID TILING.

SPECIFICATION forming part of Letters Patent No. 450,286, dated April 14, 1891.

Application filed June 24, 1889. Serial No. 315,429. (No model.)

*To all whom it may concern:*

Be it known that I, LOUIS ENRICHT, a citizen of the United States, residing in the city of New York, State of New York, have invented a new and useful Improvement in Tile Pavements, of which the following is a full, clear, and exact specification.

It is well known that earthen and other tiles when used for flooring and similar purposes, although laid with great care and in the best kinds of cement now used, are exceedingly apt to become loosened by degrees, so that one after another the tiles are liable to become separated from each other, and, unless carefully relaid, to become broken and destroyed.

My invention will produce a solid continuous tiling which will remain in perfect condition until worn away by use.

In the following specification I have described the method of constructing the same, reference being had to the accompanying drawings, in which—

Figure 1 represents a perspective view of parts of a pavement just begun to be made according to my invention, showing a portion of the wire-netting, some of the tiles, and other parts. Fig. 2 is a cross-section of Fig. 1. Fig. 3 shows one form of a stencil. Fig. 4 is another form of stencil. Fig. 5 is a cross-section of Fig. 4.

In carrying out my invention I prepare the ground-floor or base A of wood or of any other suitable material which can be made level, and upon that place a bed or layer of cement B in a plastic state, the surface of which is brought to a smooth condition. Upon the bed of cement B, I lay a course of wire-netting C, which extends over the whole surface of the bed B as far as the tiling is to be constructed. The course of cement may be about from two inches to four inches in thickness. The wire-netting should be of strong wire, made with open meshes, so as to be easily combined with and engaged by the cement (in case that is still plastic when the netting is placed thereon) and engaged by the tiling as the tiles are successively formed upon the netting. Netting of ordinary descriptions will answer the purpose.

The tiles are formed directly upon the wire bed, each tile being formed separate from the others and in its appropriate place by means of mold or stencil frames, examples of which are seen in Figs. 3 and 4, and which consist of a series of open molds E, whose dimensions correspond to the sizes of the tiles that are to be formed and whose depth or thickness is equal to the depth or thickness of the tiles to be made. Taking, for instance, the mold-frame or stencil shown in Fig. 3, the workman places it upon the wire-netting and fills its open molds E with the cement or other material which is to be used in constructing the tiles, and which must be in a plastic state. The plastic material thus placed in the open molds E is pressed down therein to the bottom by proper pressure, so as to form tiles D therein, each of which is separate from the others, and each engages at bottom with the meshes of the netting, by reason of the plastic condition of the cement or material used and by reason of the pressure employed in filling the molds E.

When the cement or plastic material has set or hardened sufficiently, the frame containing the molds or stencils is lifted up off from the tiles D, leaving them in the condition represented in Fig. 1, where the separate tiles D are seen arranged upon and in engagement with the wire-netting C, the bed of cement B and the ground floor A being beneath the netting. Where it is intended to make a pavement of different-colored tiles, the plastic material or cement employed in making the first set of tiles may be colored of any desired tint, and the tiles subsequently made be composed of plastic material of a different color or colors.

It will be observed that the tiles shown in Fig. 1 are separated from each other by unoccupied spaces. These spaces are next filled with similar plastic material of a different color or uncolored, as may be desired, thus forming another series of independent tiles, which will be separate from those first made, because the plastic cement or material of which the first series are made will have set before the cement or material to form the next series will be introduced. Temporary divisions of wood or metal may be, however, inserted in the frame to intervene between adjoining tiles, so as to prevent them from coming in contact with each other, and such division is necessary where tiles of fresh cement come in contact with each other.

Fig. 4 illustrates how variations in the sizes and positions of tiles can be made by means of variations in the molds of the frames.

In all cases it is evident that while the tiles can be varied as to color and shape, so as to be distinguishable from each other by lateral divisions, yet their bottoms will engage permanently with the meshes of the wire-netting, because they come into direct contact with the netting while the cement is yet plastic.

As the tiles are successively made the excess of cement is removed from their tops.

It is evident that my pavement can be made continuous to any extent and without outward division, except such as may be desired by the maker.

When the tiles having the colors of the pattern have been placed and become set, the plastic material having the color desired for the body or for the borders of the floor is poured around the tiles or their divisions, or, if desired, separate frames or stencils may be used for that purpose.

If a glazed surface is desired, it can be produced by covering the soft composition or cement with a sheet of glass, and when the cement is hardened the surface will be found to be smoothed or glazed.

What I claim as new, and desire to secure by Letters Patent, is—

In tile pavements, the combination of a foundation course of cement laid in a plastic state, a layer of wire-netting laid upon the cement, and a series of tiles formed of cement in a plastic state separate from each other and connected at bottom independently of each other with the netting, substantially as described.

LOUIS ENRICHT.

Witnesses:
 ALSON L. DRAKE,
 WALTER S. WILSON.